Figure 1:
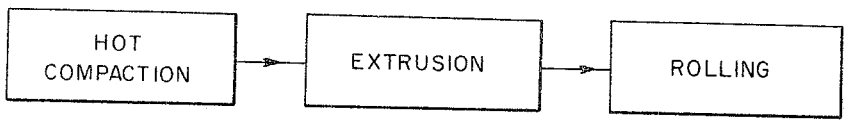

July 18, 1967  O. A. KUHL  3,331,962
INTEGRALLY BONDED ENCAPSULATED GAMMA SOURCE
Filed Sept. 17, 1964

INVENTOR.
OTTO A. KUHL
BY

United States Patent Office 3,331,962
Patented July 18, 1967

3,331,962
INTEGRALLY BONDED ENCAPSULATED
GAMMA SOURCE
Otto A. Kuhl, Northport, N.Y., assignor to the United
States of America as represented by the United States
Atomic Energy Commission
Filed Sept. 17, 1964, Ser. No. 397,346
6 Claims. (Cl. 250—106)

The invention described herein was made in the course of, or under a contract with the U.S. Atomic Energy Commission.

The present invention relates to an integrally bonded encapsulated gamma ray source and method in which cobalt-60 is enclosed in stainless steel.

During recent years there has been increased commercial interest in the application of isotopic gamma ray sources, cobalt-60 in particular, to the sterilization of medical supplies, radiation pasteurization of foods, and miscellaneous other commercial applications for this very penetrating radiation.

In patent application Ser. No. 224,879, entitled, "Food Irradiator and Method," by Kuhl and Oltmann, filed on Sept. 19, 1963, now Patent No. 3,192,054, there is described apparatus utilizing cobalt-60 as a gamma ray source for the radiation pasteurization of certain foods, such as fish, for extending their refrigerator shelf life. In the particular application of the gamma ray source in that patent application, the source consists of cobalt-60 within an envelope of stainless steel to be inserted cyclically between successive pairs of adjacent packages. As can be readily understood, the closer the packages can be brought to the source and the larger the area of application of the radiation, the more efficient will be the use of the source material and the apparatus for treating the packages of food. In general, this would be true of most, if not all, arrangements involving the use of cobalt-60 gamma ray sources and presumably of other sources as well.

In addition, it is well known that for certain types of applications, gamma ray irradiation competes with mechanical devices, such as accelerators, producing electron beams. Heretofore the mechanical devices have been of lower cost than gamma ray source apparatus, but due to improvements in isotopic techniques, devices and lower costs per curie of radiation, progress has been made to render the isotopic approach more economical. Thus, any improvement in efficiency of the gamma ray source approach will render the latter more favorable in comparison to the accelerator so that the greater advantages inherent in the use of penetrating radiation will become more readily available to industry and other potential users.

It was pointed out earlier that the efficiency of using cobalt-60 as a gamma source can be increased if large irradiation surfaces could be prepared and if the packages to be irradiated can be brought closer to the source plaques. In a typical construction of source plaques, such as cobalt-60 wrapped in stainless steel, a layer of the isotopic material is placed within an envelope of the stainless steel and the rim of the envelope is welded so as to seal in the cobalt. As to the thickness of the envelope material, for best efficiency, the objective is to make the source as transparent to its own radiation as possible, thereby dictating a thin cladding material. But the assembly must be of sufficient thickness to insure adequate strength of the plaque. As a result, a compromise between the two criteria, not wholly satisfactory, is reached.

In addition, spacing of the plaque from the articles to be irradiated must take into account the dimensional variations which occur in manufacture and variations over the life of the apparatus and also the changes due to temperature fluctuations. Furthermore, these source plaques become quite hot when in use so that size and thickness limitations of the cobalt-60 are imposed which are dictated by the heat transfer capabilities of the assembly.

Heretofore, no attempt has been made in the case of cobalt-60 source plaques to bond the isotopic material to the envelope material. Due to the fact that suitable plaques have been made for the past number of years without integral bonding, there did not appear to be any purpose to bond the two materials together, especially as it would appear, initially at least, that this construction would entail an additional expense.

However, I have discovered that the integral bonding of cobalt-60 to its envelope of stainless steel, contrary to previous thinking on the subject, brings about many unexpected and heretofore unsuspected advantages not only in the basic construction but also as to improved plaque designs and makes more efficient utilization of these source plaques possible. For example, it was found that by integrally bonding the cobalt-60 to the stainless steel envelope, the source plaque became a much sturdier and stronger article which made it possible to make the cladding material thinner. This reduces heating in the plaque which minimizes the cooling problem and makes the device more efficient since the envelope material interferes to a lesser extent with the gamma rays.

Furthermore, it was discovered that the elimination of the parting line between the cobalt and the stainless steel increased the heat transfer capability of the device and rendered it dimensionally more stable, i.e., it could be made to closer tolerations with the expectation that the dimension would be maintained in use to an extent which is greater than is the case in plaques made by the more conventional techniques.

Still another unexpected benefit which has been derived from the bonding of the cobalt to its cladding arises out of the way in which the cobalt is rendered radioactive. Typically, this is accomplished by inserting the clad cobalt in a reactor where neutron bombardment converts the cobalt to its unstable isotope. One of the risks involved in the conventional cladding technique and a major source of final product rejection, is the possibility that degassing and removal of impurities might not be complete so that during irradiation in the reactor the gasses and/or impurities might expand damaging the source and, in fact, even blow the capsule containing it. With the use of bonded cobalt and cladding, this possibility is totally avoided as there are no voids remaining after bonding which could trap gasses or impurities.

It is thus a first object of this invention to provide a gamma irradiation source in which the radioactive isotope is integrally bonded to its envelope.

A further object of the invention is to provide a gamma ray source of cobalt-60 clad in stainless steel in which the materials are integrally bonded together.

Still another object of this invention is to provide an extra thin, dimensionally stable gamma ray source of cobalt-60 integrally bonded with its cladding of stainless steel.

Other objects and advantages of this invention will hereinafter become more obvious from the following description of a preferred embodiment of this invention.

Figure 2:
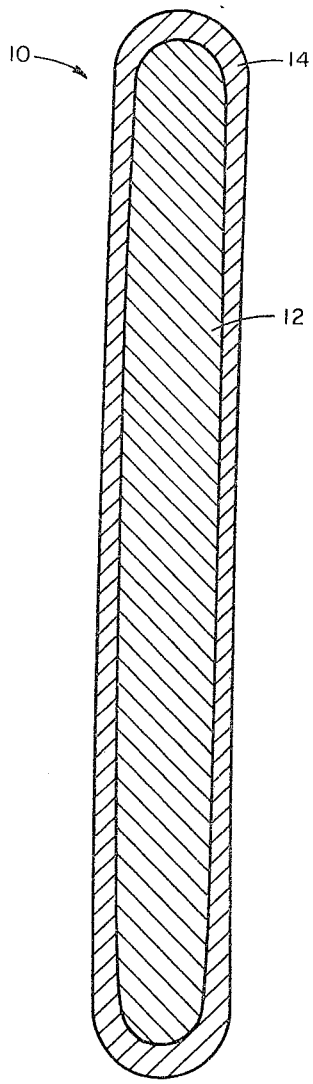

The accompanying drawing illustrates a preferred embodiment of the invention, as follows:

FIGURE 1 illustrates schematically the steps involved in preparing the integrally bonded encapsulated gamma source; and FIGURE 2 is a view in cross-section of a typical source.

Heretofore, gamma ray sources consisting of cobalt-60 encased in a cladding of stainless steel were prepared as in the following example:

A strip of reactor grade cobalt is first encapulsated in a stainless steel sheath with both ends welded closed with an end piece. This encapsulation is accomplished by inserting the strip of cobalt into a stainless steel tube and then flattening the tube in a press so that the steel forms a skin over the cobalt. As might be expected, along the edges a gas space is formed within the tube. This prepared assembly is activated in a suitable reactor or other neutron source and then another stainless steel sheath is used as the second encapsulation with end pieces. A typical finished source is 13 inches long, .800 inch wide and .150 inch thick.

As pointed out above, this conventional type of construction results in a fairly thick slab which lacks the degree of dimensional stability which one skilled in the art would like to have, while side voids dilute the radioactive surface area thereby decreasing the curie/cm.$^2$ concentration and the corresponding effective dose rate. A thinner, more efficient construction of a source has been devised in accordance with this invention in which the crucial feature is the bonding of the cobalt-60 to its stainless steel cladding material.

In a preferred embodiment of this invention, referring to FIG. 1 the source is prepared by first hot compacting cobalt powder in a stainless steel sleeve. Then the sleeve and cobalt are co-extruded under adequate pressure and temperature to obtain bonding of the two materials. After this step, the clad assembly is rolled to size. As shown in FIG. 2, source 10 consists of cobalt sheet 12 fully clad and bonded to stainless steel envelope 14. A typical final thickness of the clad cobalt is .090 inch, or 60 mils of cobalt and 15 mils stainless steel on each side, which is a substantial reduction in the thickness without reducing the structural rigidity of the assembly.

In preparing sources in accordance with this invention, it was discovered that a much smaller proportion of defective sources was produced. In preparing the conventional, unbonded sources, as previously mentioned, it is not unusual for air pockets to be formed at some points along the adjacent surfaces of cobalt-60 and the cladding material, as might be expected since they are merely pressed together. However, in the bonded construction, this type of defect is almost totally avoided and the result is that greater production economies are achieved by reducing the incidence of defective sources.

It was also found that with reduced thickness it was possible to obtain the strength and dimensional stability which to obtain in the conventionally prepared source required the less efficient, thicker construction.

It is thus seen that there has been provided a unique and highly improved source construction and method in which economies in production and in use are obtained. While only a preferred embodiment of the invention has been described, it is understood that the invention is not to be limited thereby but is to be defined by the scope of the appended claims.

I claim:

1. A source of gamma radiation comprising a sheet of activated material enclosed within an envelope of cladding material, said activated and cladding materials being metallurgically bonded together continuously along all facing surfaces.

2. The source of claim 1 in which said activated material is cobalt-60.

3. The source of claim 2 in which said cladding material is stainless steel.

4. A method of preparing a source of gamma radiation comprising the steps of hot compacting a powdered stable metal in a sleeve, co-extruding the sleeve and compacted metal under sufficient pressure and temperature to bond metallurgically said metal to said sleeve continuously along their contacting surfaces, rolling the extruded sleeve and metal to the desired size and shape assembly, and subjecting the rolled assembly to neutron irradiation to cause the metal to be in part converted to an unstable isotope thereof emitting gamma irradiation.

5. The method of claim 4 in which the metal is cobalt and the unstable isotope is cobalt-60.

6. The method of claim 5 in which the sleeve is made from stainless steel.

References Cited

UNITED STATES PATENTS

| | | | |
|---|---|---|---|
| 2,797,333 | 6/1957 | Reiffel | 250—106 X |
| 2,968,734 | 1/1961 | Yeomans | 250—106 |
| 2,975,113 | 3/1961 | Gordon | 250—106 X |
| 3,142,560 | 7/1964 | Storchheim | 29—420.5 X |
| 3,145,181 | 8/1964 | Courtois et al. | 250—106 X |
| 3,253,152 | 5/1966 | Lahr | 250—106 |

ARCHIE R. BORCHELT, *Primary Examiner.*